United States Patent
Sallee

(10) Patent No.: US 11,037,027 B2
(45) Date of Patent: Jun. 15, 2021

(54) COMPUTER ARCHITECTURE FOR AND-OR NEURAL NETWORKS

(71) Applicant: Raytheon Company, Waltham, MA (US)

(72) Inventor: Philip A. Sallee, South Riding, VA (US)

(73) Assignee: Raytheon Company, Waltham, MA (US)

(*) Notice: Subject to any disclaimer, the term of this patent is extended or adjusted under 35 U.S.C. 154(b) by 159 days.

(21) Appl. No.: 16/170,656

(22) Filed: Oct. 25, 2018

(65) Prior Publication Data

US 2020/0134376 A1    Apr. 30, 2020

(51) Int. Cl.
   G06K 9/62    (2006.01)
   G06N 3/08    (2006.01)
   G06N 3/04    (2006.01)

(52) U.S. Cl.
   CPC ......... *G06K 9/6257* (2013.01); *G06N 3/0472* (2013.01); *G06N 3/0481* (2013.01); *G06N 3/084* (2013.01)

(58) Field of Classification Search
   None
   See application file for complete search history.

(56) References Cited

U.S. PATENT DOCUMENTS

| | | | | |
|---|---|---|---|---|
| 6,601,054 B1* | 7/2003 | Lo | ............ | G05B 5/01 706/30 |
| 10,832,137 B2* | 11/2020 | Baker | ............ | G06N 3/084 |
| 2017/0243110 A1* | 8/2017 | Zamora Esquivel | .... | G06N 3/08 |
| 2018/0144242 A1* | 5/2018 | Simard | ............ | G06N 3/0454 |
| 2019/0205744 A1* | 7/2019 | Mondello | ............ | G05D 1/0287 |
| 2020/0065964 A1* | 2/2020 | Takeshima | ......... | G01R 33/4824 |
| 2020/0143255 A1* | 5/2020 | Daniel | ............ | G06N 3/0635 |
| 2020/0389182 A1* | 12/2020 | Li | ............ | G06F 7/5443 |

OTHER PUBLICATIONS

LeCun, Yann, et al. "Gradient-based learning applied to document recognition." Proceedings of the IEEE 86.11 (1998): 2278-2324. (Year: 1998).*

"Convolutional Neural Network with Logarithmic and Exponential", Retrieved from the Internet: <URL: https://stackoverflow.com/questions/47726549/convolutional-neural-network-with-logarithmic-and-exponential-activation-function>, (Accessed Jun. 17, 2020), 2 pgs.

Hines, J Wesley, "A Logarithmic Neural Network Architechture for Unbounded Non-Linear Function Approximation", IEEE International Conference on Neural Networks, vol. 2, (1996), 1245-1250.

* cited by examiner

*Primary Examiner* — Sean M Conner

(74) *Attorney, Agent, or Firm* — Schwegman Lundberg & Woessner, P.A.

(57) ABSTRACT

A computer architecture for an and-or neural network is disclosed. A computing machine accesses an input vector. The input vector comprises a numeric representation of an input to a neural network. The computing machine provides the input vector to the neural network comprising a plurality of ordered layers. The plurality of ordered layers are alternating AND-layers and OR-layers. Each of the plurality of ordered layers receives input from a preceding layer and/or provides output to a next layer. The computing machine generates an output of the neural network based on an output of a last one of the plurality of ordered layers in the neural network.

19 Claims, 11 Drawing Sheets

COMPUTER ARCHITECTURE FOR AND-OR NEURAL NETWORKS

TECHNICAL FIELD

Embodiments pertain to computer architecture. Some embodiments relate to a computer architecture for and-or neural networks.

BACKGROUND

Neural networks are useful for many purposes, such as optical character recognition, image recognition, network intruder detection, spam filtering, and the like. New technologies for neural networks may be desirable to perform these and other functions in more efficient ways (e.g., using fewer processing resources or consuming less time).

DETAILED DESCRIPTION

Figure 1:
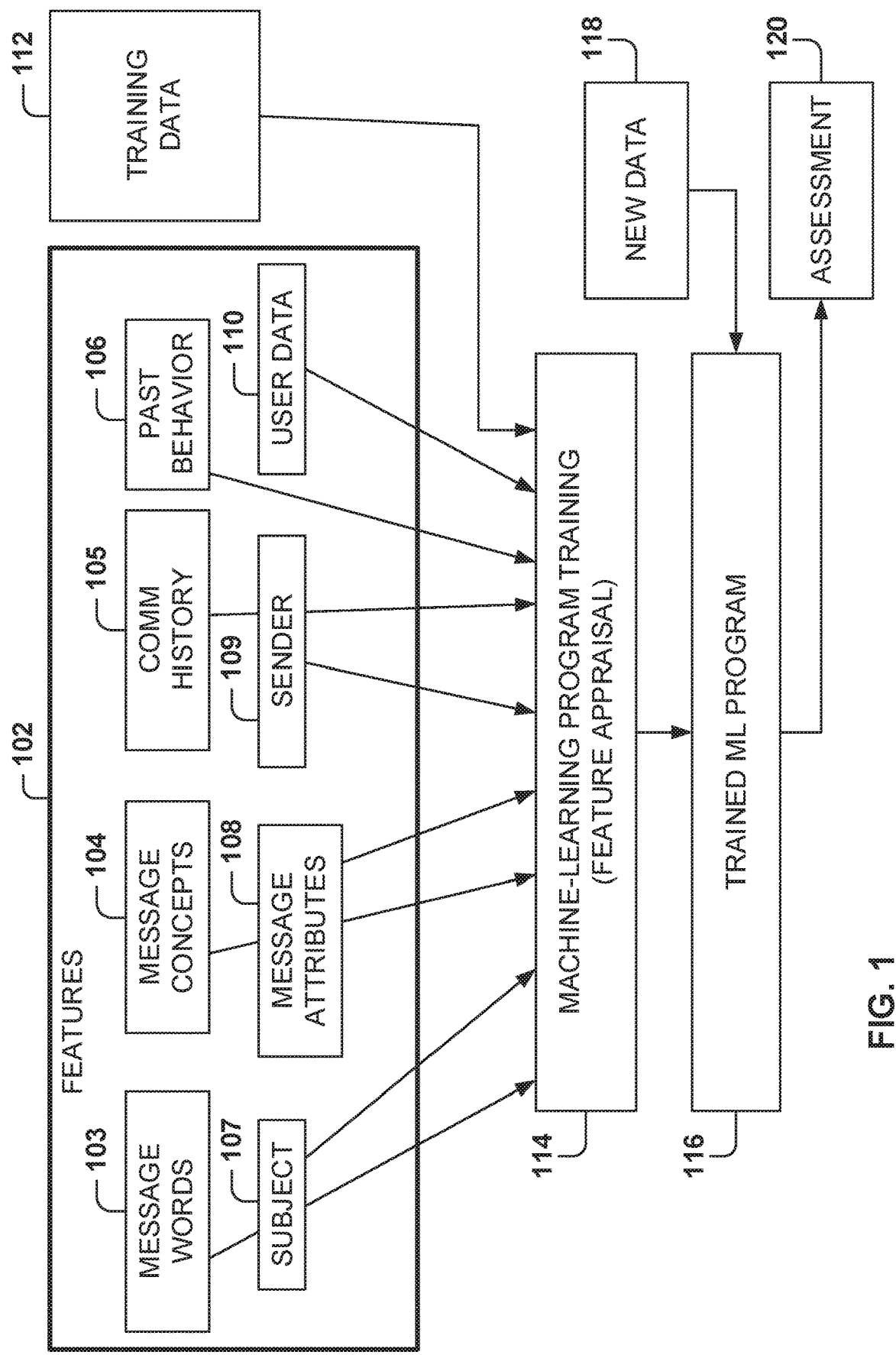
FIG. 1 illustrates the training and use of a machine-learning program, in accordance with some embodiments.

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

As discussed above, neural networks are useful for many purposes, such as optical character recognition, image recognition, network intruder detection, spam filtering, and the like. New technologies for neural networks may be desirable to perform these and other functions more accurately and in more efficient ways (e.g., using fewer processing resources or consuming less time).

Neural networks generally receive, as input, a numeric input vector. The numeric input vector is provided to a sequence of layers, and processed at each layer, to generate an output. Some convolutional neural networks (CNNs) employ spatial max-pooling to enable networks to learn features that are spatially invariant. Max pooling layers compute the maximum activation within regions of a spatial network. This results in loss of some information, such as information about where the feature was located—information about the position of the feature is thrown away for subsequent processing. Other types of pooling include average pooling, and cross-channel pooling, in which pooling is performed across channels, or features. In some cases, pooling is limited to spatial pooling, not across features, and the parameters and type of pooling is not learned by the network, but determined a-priori by the network architecture. The max pooling operation results in a lack of gradient information for non-maximal activations, which can increase the potential of hitting local minima during training. Pooling is important for obtaining invariances. However, some schemes limit the nature of the invariances that can be learned.

Some aspects of the technology described herein are directed to an and-or neural network—a new type of neural network that can be used to solve some problems (e.g., optical character recognition or spam filtering) in a different or more efficient manner. The and-or neural network includes multiple alternating AND-layers and OR-layers through which an input vector is processed to arrive at an output. In one example, the input vector represents an input image, and the output is a recognition of an object or character(s) within the image.

Some aspects of the technology described herein are directed to a neural network system/apparatus implemented in processing circuitry of one or more machines. The processing circuitry accesses an input vector. The input vector includes a numeric representation of an input to a neural network. The processing circuitry provides the input vector to the neural network comprising multiple ordered layers. The multiple ordered layers are alternating AND-layers and OR-layers. Each of the multiple ordered layers receives input from a preceding layer and/or provides output to a next layer. The processing circuitry generates an output of the neural network based on an output of a last one of the multiple ordered layers in the neural network.

In executing an OR-layer from the neural network, the processing circuitry accesses an OR-layer input vector. The processing circuitry computes a linear function for the OR-layer. The linear function for the OR-layer is a linear function of the OR-layer input vector, to generate an intermediate result vector. Each OR-layer has a different linear function for the OR-layer. The processing circuitry computes a logarithmic function of the intermediate result vector to generate a resulting logarithmic probability vector. The processing circuitry outputs, to the next layer, the resulting logarithmic probability vector.

In executing an AND-layer from the neural network, the processing circuitry accesses an input logarithmic probability vector for the AND-layer. The processing circuitry applies a linear function for the AND-layer to the input logarithmic probability vector. Each AND-layer has a different linear function. The processing circuitry applies an AND-layer mathematical function to a result of the linear function for the AND-layer to generate an AND-layer output vector. The processing circuitry outputs, to the next layer, the AND-layer output vector.

FIG. 1 illustrates the training and use of a machine-learning program, according to some example embodiments. In some example embodiments, machine-learning programs (MLPs), also referred to as machine-learning algorithms or tools, are utilized to perform operations associated with machine learning tasks, such as image recognition or machine translation.

Machine learning is a field of study that gives computers the ability to learn without being explicitly programmed. Machine learning explores the study and construction of algorithms, also referred to herein as tools, which may learn from existing data and make predictions about new data. Such machine-learning tools operate by building a model from example training data 112 in order to make data-driven predictions or decisions expressed as outputs or assessments 120. Although example embodiments are presented with respect to a few machine-learning tools, the principles presented herein may be applied to other machine-learning tools.

In some example embodiments, different machine-learning tools may be used. For example, Logistic Regression (LR), Naive-Bayes, Random Forest (RF), neural networks (NN), matrix factorization, and Support Vector Machines (SVM) tools may be used for classifying or scoring job postings.

Two common types of problems in machine learning are classification problems and regression problems. Classification problems, also referred to as categorization problems, aim at classifying items into one of several category values (for example, is this object an apple or an orange). Regression algorithms aim at quantifying some items (for example, by providing a value that is a real number). The machine-learning algorithms utilize the training data 112 to find correlations among identified features 102 that affect the outcome.

The machine-learning algorithms utilize features 102 for analyzing the data to generate assessments 120. A feature 102 is an individual measurable property of a phenomenon being observed. The concept of a feature is related to that of an explanatory variable used in statistical techniques such as linear regression. Choosing informative, discriminating, and independent features is important for effective operation of the MLP in pattern recognition, classification, and regression. Features may be of different types, such as numeric features, strings, and graphs.

In one example embodiment, the features 102 may be of different types and may include one or more of words of the message 103, message concepts 104, communication history 105, past user behavior 106, subject of the message 107, other message attributes 108, sender 109, and user data 110.

The machine-learning algorithms utilize the training data 112 to find correlations among the identified features 102 that affect the outcome or assessment 120. In some example embodiments, the training data 112 includes labeled data, which is known data for one or more identified features 102 and one or more outcomes, such as detecting communication patterns, detecting the meaning of the message, generating a summary of the message, detecting action items in the message, detecting urgency in the message, detecting a relationship of the user to the sender, calculating score attributes, calculating message scores, etc.

With the training data 112 and the identified features 102, the machine-learning tool is trained at operation 114. The machine-learning tool appraises the value of the features 102 as they correlate to the training data 112. The result of the training is the trained machine-learning program 116.

When the machine-learning program 116 is used to perform an assessment, new data 118 is provided as an input to the trained machine-learning program 116, and the machine-learning program 116 generates the assessment 120 as output. For example, when a message is checked for an action item, the machine-learning program utilizes the message content and message metadata to determine if there is a request for an action in the message.

Machine learning techniques train models to accurately make predictions on data fed into the models (e.g., what was said by a user in a given utterance; whether a noun is a person, place, or thing; what the weather will be like tomorrow). During a learning phase, the models are developed against a training dataset of inputs to optimize the models to correctly predict the output for a given input. Generally, the learning phase may be supervised, semi-supervised, or unsupervised; indicating a decreasing level to which the "correct" outputs are provided in correspondence to the training inputs. In a supervised learning phase, all of the outputs are provided to the model and the model is directed to develop a general rule or algorithm that maps the input to the output. In contrast, in an unsupervised learning phase, the desired output is not provided for the inputs so that the model may develop its own rules to discover relationships within the training dataset. In a semi-supervised learning phase, an incompletely labeled training set is provided, with some of the outputs known and some unknown for the training dataset.

Models may be run against a training dataset for several epochs (e.g., iterations), in which the training dataset is repeatedly fed into the model to refine its results. For example, in a supervised learning phase, a model is developed to predict the output for a given set of inputs, and is evaluated over several epochs to more reliably provide the output that is specified as corresponding to the given input for the greatest number of inputs for the training dataset. In another example, for an unsupervised learning phase, a model is developed to cluster the dataset into n groups, and is evaluated over several epochs as to how consistently it places a given input into a given group and how reliably it produces the n desired clusters across each epoch.

Once an epoch is run, the models are evaluated and the values of their variables are adjusted to attempt to better refine the model in an iterative fashion. In various aspects, the evaluations are biased against false negatives, biased against false positives, or evenly biased with respect to the overall accuracy of the model. The values may be adjusted in several ways depending on the machine learning technique used. For example, in a genetic or evolutionary algorithm, the values for the models that are most successful in predicting the desired outputs are used to develop values for models to use during the subsequent epoch, which may include random variation/mutation to provide additional data points. One of ordinary skill in the art will be familiar with several other machine learning algorithms that may be applied with the present disclosure, including linear regression, random forests, decision tree learning, neural networks, deep neural networks, etc.

Each model develops a rule or algorithm over several epochs by varying the values of one or more variables affecting the inputs to more closely map to a desired result, but as the training dataset may be varied, and is preferably very large, perfect accuracy and precision may not be achievable. A number of epochs that make up a learning phase, therefore, may be set as a given number of trials or a fixed time/computing budget, or may be terminated before that number/budget is reached when the accuracy of a given model is high enough or low enough or an accuracy plateau has been reached. For example, if the training phase is designed to run n epochs and produce a model with at least 95% accuracy, and such a model is produced before the $n^{th}$ epoch, the learning phase may end early and use the produced model satisfying the end-goal accuracy threshold. Similarly, if a given model is inaccurate enough to satisfy a random chance threshold (e.g., the model is only 55% accurate in determining true/false outputs for given inputs), the learning phase for that model may be terminated early, although other models in the learning phase may continue training. Similarly, when a given model continues to provide similar accuracy or vacillate in its results across multiple epochs—having reached a performance plateau—the learning phase for the given model may terminate before the epoch number/computing budget is reached.

Once the learning phase is complete, the models are finalized. In some example embodiments, models that are finalized are evaluated against testing criteria. In a first example, a testing dataset that includes known outputs for its inputs is fed into the finalized models to determine an accuracy of the model in handling data that is has not been trained on. In a second example, a false positive rate or false negative rate may be used to evaluate the models after finalization. In a third example, a delineation between data clusterings is used to select a model that produces the clearest bounds for its clusters of data.

Figure 2:
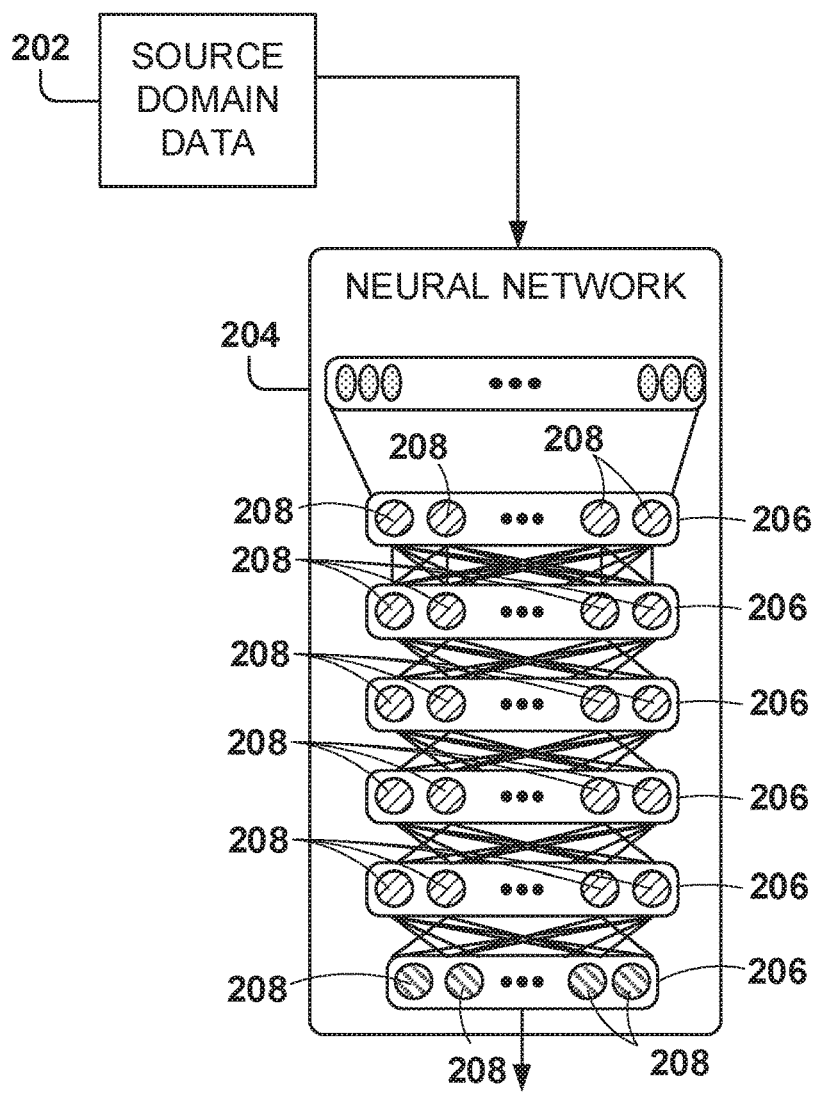
FIG. 2 illustrates an example neural network, in accordance with some embodiments.
Figure 2:
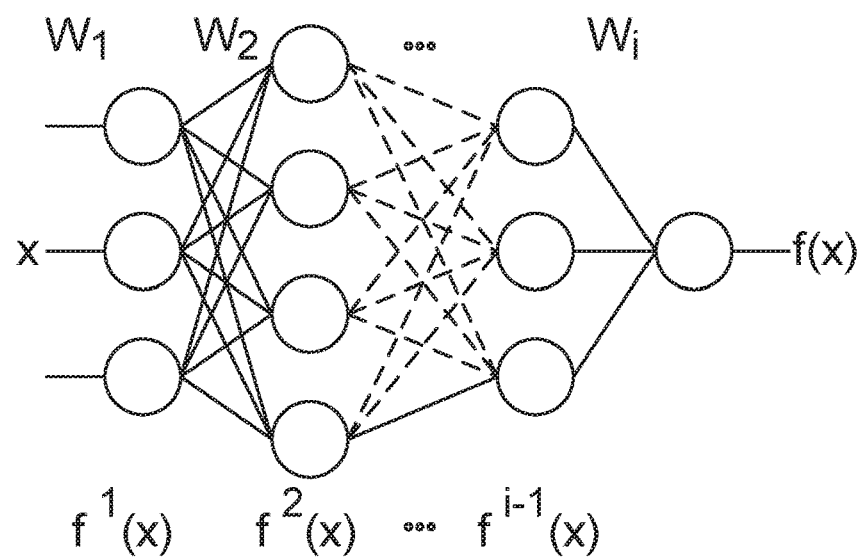

FIG. 2 illustrates an example neural network 204, in accordance with some embodiments. As shown, the neural network 204 receives, as input, source domain data 202. The input is passed through a plurality of layers 206 to arrive at an output. Each layer includes multiple neurons 208. The neurons 208 receive input from neurons of a previous layer and apply weights to the values received from those neurons in order to generate a neuron output. The neuron outputs from the final layer 206 are combined to generate the output of the neural network.

As illustrated at the bottom of FIG. 2, the input is a vector x. The input is passed through multiple layers 206, where weights are applied to the input to each layer to arrive $f^1(x)$, $f^2(x)$, ..., $f^{-1}(x)$, until finally the output f(x) is computed.

In some example embodiments, the neural network 204 (e.g., deep learning, deep convolutional, or recurrent neural network) comprises a series of neurons 208, such as Long Short Term Memory (LSTM) nodes, arranged into a network. A neuron 208 is an architectural element used in data processing and artificial intelligence, particularly machine learning, which includes memory that may determine when to "remember" and when to "forget" values held in that memory based on the weights of inputs provided to the given neuron 208. Each of the neurons 208 used herein are configured to accept a predefined number of inputs from other neurons 208 in the neural network 204 to provide relational and sub-relational outputs for the content of the frames being analyzed. Individual neurons 208 may be chained together and/or organized into tree structures in various configurations of neural networks to provide interactions and relationship learning modeling for how each of the frames in an utterance are related to one another.

For example, an LSTM serving as a neuron includes several gates to handle input vectors (e.g., phonemes from an utterance), a memory cell, and an output vector (e.g., contextual representation). The input gate and output gate control the information flowing into and out of the memory cell, respectively, whereas forget gates optionally remove information from the memory cell based on the inputs from linked cells earlier in the neural network. Weights and bias vectors for the various gates are adjusted over the course of a training phase, and once the training phase is complete, those weights and biases are finalized for normal operation. One of skill in the art will appreciate that neurons and neural networks may be constructed programmatically (e.g., via software instructions) or via specialized hardware linking each neuron to form the neural network.

Neural networks utilize features for analyzing the data to generate assessments (e.g., recognize units of speech). A feature is an individual measurable property of a phenomenon being observed. The concept of feature is related to that of an explanatory variable used in statistical techniques such as linear regression. Further, deep features represent the output of nodes in hidden layers of the deep neural network.

A neural network, sometimes referred to as an artificial neural network, is a computing system/apparatus based on consideration of biological neural networks of animal brains. Such systems/apparatus progressively improve performance, which is referred to as learning, to perform tasks, typically without task-specific programming. For example, in image recognition, a neural network may be taught to identify images that contain an object by analyzing example images that have been tagged with a name for the object and, having learnt the object and name, may use the analytic results to identify the object in untagged images. A neural network is based on a collection of connected units called neurons, where each connection, called a synapse, between neurons can transmit a unidirectional signal with an activating strength that varies with the strength of the connection. The receiving neuron can activate and propagate a signal to downstream neurons connected to it, typically based on whether the combined incoming signals, which are from potentially many transmitting neurons, are of sufficient strength, where strength is a parameter.

A deep neural network (DNN) is a stacked neural network, which is composed of multiple layers. The layers are composed of nodes, which are locations where computation occurs, loosely patterned on a neuron in the human brain, which fires when it encounters sufficient stimuli. A node combines input from the data with a set of coefficients, or weights, that either amplify or dampen that input, which assigns significance to inputs for the task the algorithm is trying to learn. These input-weight products are summed, and the sum is passed through what is called a node's activation function, to determine whether and to what extent that signal progresses further through the network to affect the ultimate outcome. A DNN uses a cascade of many layers of non-linear processing units for feature extraction and transformation. Each successive layer uses the output from the previous layer as input. Higher-level features are derived from lower-level features to form a hierarchical representation. The layers following the input layer may be convolution layers that produce feature maps that are filtering results of the inputs and are used by the next convolution layer.

In training of a DNN architecture, a regression, which is structured as a set of statistical processes for estimating the relationships among variables, can include a minimization of a cost function. The cost function may be implemented as a function to return a number representing how well the neural network performed in mapping training examples to correct output. In training, if the cost function value is not within a pre-determined range, based on the known training images, backpropagation is used, where backpropagation is a common method of training artificial neural networks that are used with an optimization method such as a stochastic gradient descent (SGD) method.

Use of backpropagation can include propagation and weight update. When an input is presented to the neural network, it is propagated forward through the neural network, layer by layer, until it reaches the output layer. The output of the neural network is then compared to the desired output, using the cost function, and an error value is calculated for each of the nodes in the output layer. The error values are propagated backwards, starting from the output, until each node has an associated error value which roughly represents its contribution to the original output. Backpropagation can use these error values to calculate the gradient of the cost function with respect to the weights in the neural network. The calculated gradient is fed to the selected optimization method to update the weights to attempt to minimize the cost function.

Figure 3:
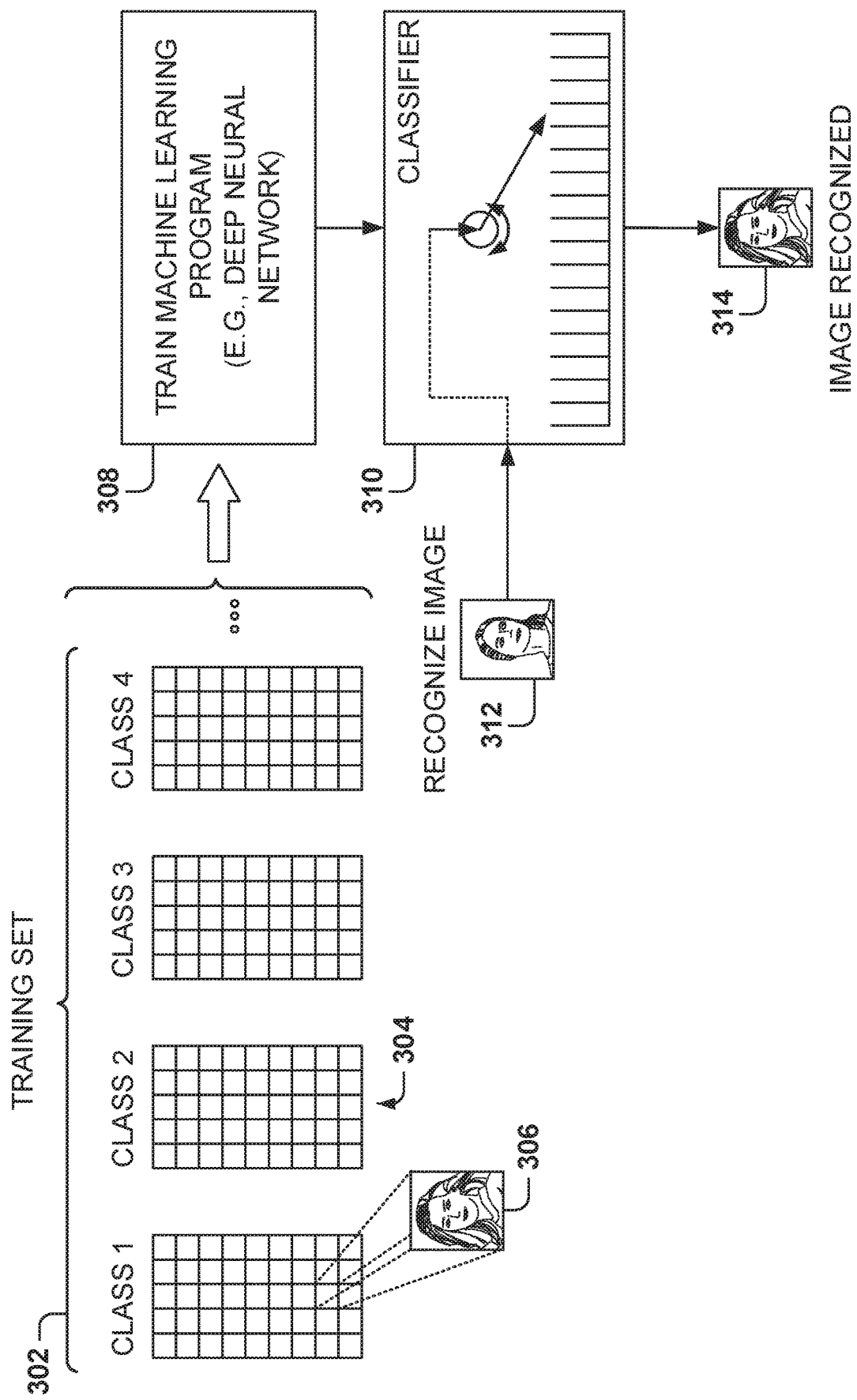
FIG. 3 illustrates the training of an image recognition machine learning program, in accordance with some embodiments.

FIG. 3 illustrates the training of an image recognition machine learning program, in accordance with some embodiments. The machine learning program may be implemented at one or more computing machines. Block 302 illustrates a training set, which includes multiple classes 304. Each class 304 includes multiple images 306 associated with the class. Each class 304 may correspond to a type of object in the image 306 (e.g., a digit 0-9, a man or a woman, a cat or a dog, etc.). In one example, the machine learning program is trained to recognize images of the presidents of the United States, and each class corresponds to each president (e.g., one class corresponds to Donald Trump, one class corresponds to Barack Obama, one class corresponds to George W. Bush, etc.). At block 308 the machine learning program is trained, for example, using a deep neural network. At block 310, the trained classifier, generated by the training of block 308, recognizes an image 312, and at block 314 the image is recognized. For example, if the image 312 is a photograph of Bill Clinton, the classifier 312 recognizes the image as corresponding to Bill Clinton at block 314.

FIG. 3 illustrates the training of a classifier, according to some example embodiments. A machine learning algorithm is designed for recognizing faces, and a training set 302 includes data that maps a sample to a class 304 (e.g., a class includes all the images of purses). The classes may also be referred to as labels. Although embodiments presented herein are presented with reference to object recognition, the same principles may be applied to train machine-learning programs used for recognizing any type of items.

The training set 302 includes a plurality of images of for each class (e.g., image 306), and each image is associated with one of the categories to be recognized (e.g., a class). The machine learning program is trained 308 with the training data to generate a classifier 310 operable to recognize images. In some example embodiments, the machine learning program is a DNN.

When an input image 312 is to be recognized, the classifier 310 analyzes the input image 312 to identify the class (e.g., class 314) corresponding to the input image 312.

Figure 4:
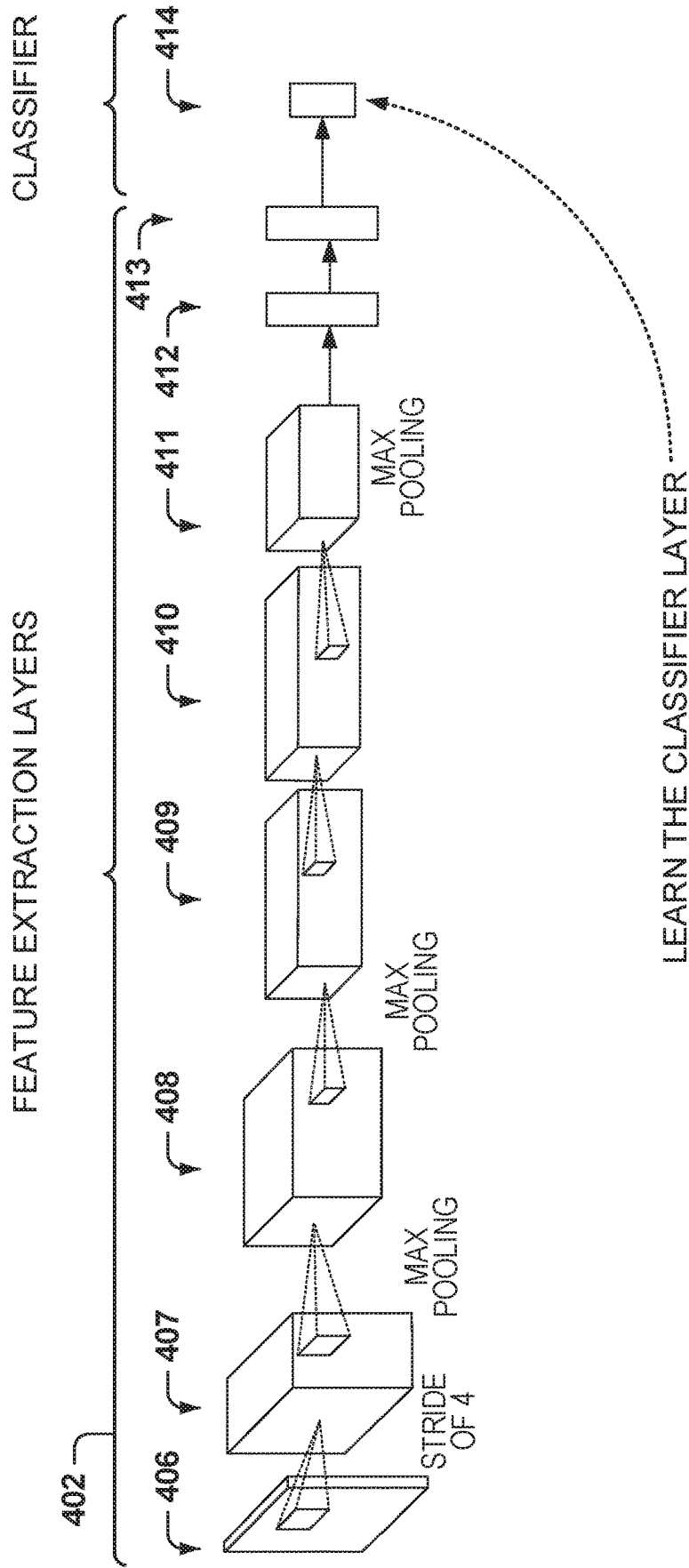
FIG. 4 illustrates the feature-extraction process and classifier training, in accordance with some embodiments.

FIG. 4 illustrates the feature-extraction process and classifier training, according to some example embodiments. Training the classifier may be divided into feature extraction layers 402 and classifier layer 414. Each image is analyzed in sequence by a plurality of layers 406-413 in the feature-extraction layers 402.

With the development of deep convolutional neural networks, the focus in face recognition has been to learn a good face feature space, in which faces of the same person are close to each other, and faces of different persons are far away from each other. For example, the verification task with the LFW (Labeled Faces in the Wild) dataset has been often used for face verification.

Many face identification tasks (e.g., MegaFace and LFW) are based on a similarity comparison between the images in the gallery set and the query set, which is essentially a K-nearest-neighborhood (KNN) method to estimate the person's identity. In the ideal case, there is a good face feature extractor (inter-class distance is always larger than the intra-class distance), and the KNN method is adequate to estimate the person's identity.

Feature extraction is a process to reduce the amount of resources required to describe a large set of data. When performing analysis of complex data, one of the major problems stems from the number of variables involved. Analysis with a large number of variables generally requires a large amount of memory and computational power, and it may cause a classification algorithm to overfit to training samples and generalize poorly to new samples. Feature extraction is a general term describing methods of constructing combinations of variables to get around these large data-set problems while still describing the data with sufficient accuracy for the desired purpose.

In some example embodiments, feature extraction starts from an initial set of measured data and builds derived values (features) intended to be informative and non-redundant, facilitating the subsequent learning and generalization steps. Further, feature extraction is related to dimensionality reduction, such as be reducing large vectors (sometimes with very sparse data) to smaller vectors capturing the same, or similar, amount of information.

Determining a subset of the initial features is called feature selection. The selected features are expected to contain the relevant information from the input data, so that the desired task can be performed by using this reduced representation instead of the complete initial data. DNN utilizes a stack of layers, where each layer performs a function. For example, the layer could be a convolution, a non-linear transform, the calculation of an average, etc. Eventually this DNN produces outputs by classifier 414. In FIG. 4, the data travels from left to right and the features are extracted. The goal of training the neural network is to find the parameters of all the layers that make them adequate for the desired task.

In some example embodiments, the structure of each layer is predefined. For example, a convolution layer may contain small convolution kernels and their respective convolution parameters, and a summation layer may calculate the sum, or the weighted sum, of two pixels of the input image. Training assists in defining the weight coefficients for the summation.

One way to improve the performance of DNNs is to identify newer structures for the feature-extraction layers, and another way is by improving the way the parameters are identified at the different layers for accomplishing a desired task. The challenge is that for a typical neural network, there may be millions of parameters to be optimized. Trying to optimize all these parameters from scratch may take hours, days, or even weeks, depending on the amount of computing resources available and the amount of data in the training set.

FIG. 4 describes a max pooling scheme. However, in some aspects of the technology described herein, the max pooling layers are replaced with OR-layers, as described in detail below.

Figure 5:
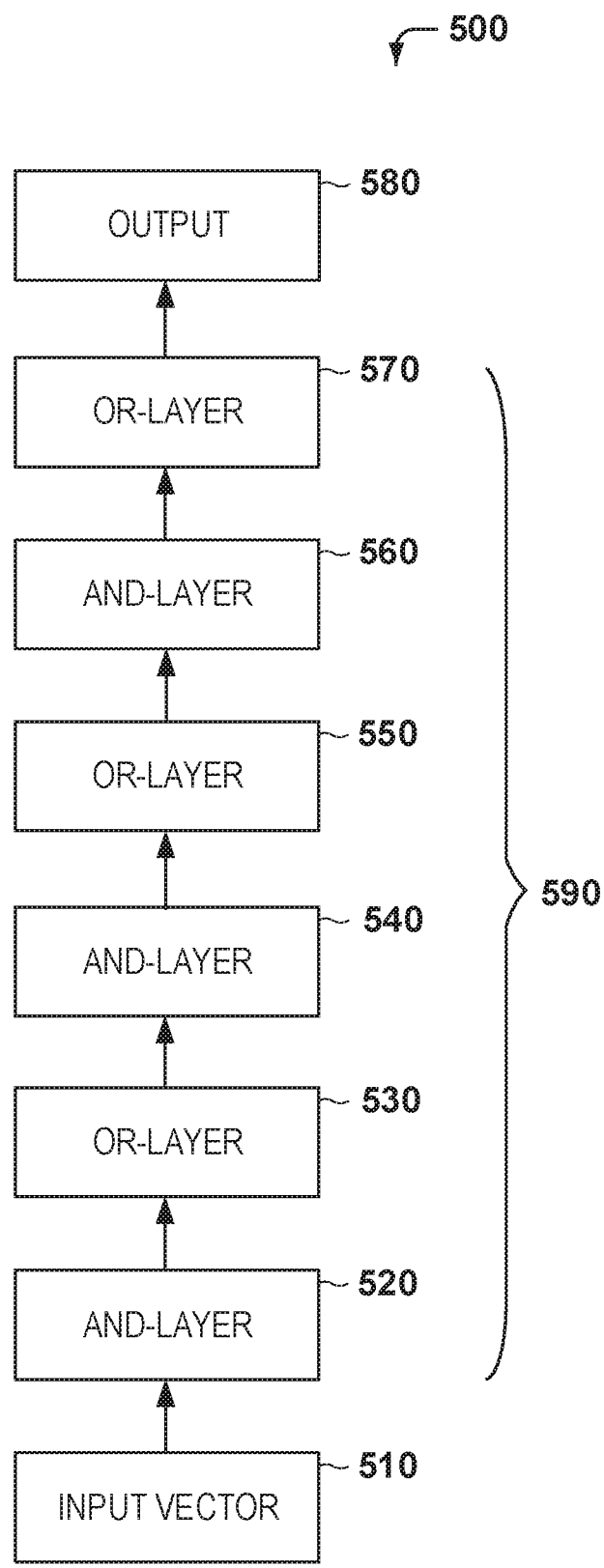
FIG. 5 is a data flow diagram of an and-or neural network, in accordance with some embodiments.

FIG. 5 is a data flow diagram 500 of an and-or neural network, in accordance with some embodiments.

As shown in the data flow diagram 500 of FIG. 5, an input vector 510 is provide to an and-or neural network 590, and the and-or neural network 590 generates an output 580. For example, the input vector 510 may be a numerical representation of an email message, and the output 580 may represent whether or not the email message is spam. As shown, the and-or neural network 590 includes multiple AND-layers 520, 540, and 560, and multiple OR-layers 530, 550, and 570. The input vector 510 is provided to the AND-layer 520, which provides output value(s) to the OR-layer 530, which provides output value(s) to the AND-layer 540, which provides output value(s) to the OR-layer 550, which provides output value(s) to the AND-layer 560, which provides output value(s) to the OR-layer 570, which generates the output 580 of the neural network 590. As described above, each layer 520-570 of the neural network 590 may include multiple neurons, each of which processes part of an input from a previous layer and generates part of the output provided to a next layer. While the neural network 590 is shown to include three AND-layers 520, 540, and 560 and three OR-layers 530, 550, and 570, the neural network 590 may include any number of AND-layers or OR-layers. Examples of the operation of the neural network 590 are described in conjunction with FIGS. 6-8.

As shown in FIG. 5, the first layer of the and-or neural network 590 is the AND-layer 520, and the last layer is the OR-layer 580. However, in alternative embodiments, the first layer may be an OR-layer and/or the last layer may be an AND-layer. In addition, as shown in FIG. 5, each AND-layer 520, 540, 560 of the neural network 590 is followed by an OR-layer, and each OR-layer 530 and 550 (except for the last layer 570) is followed by an AND-layer.

Figure 6:
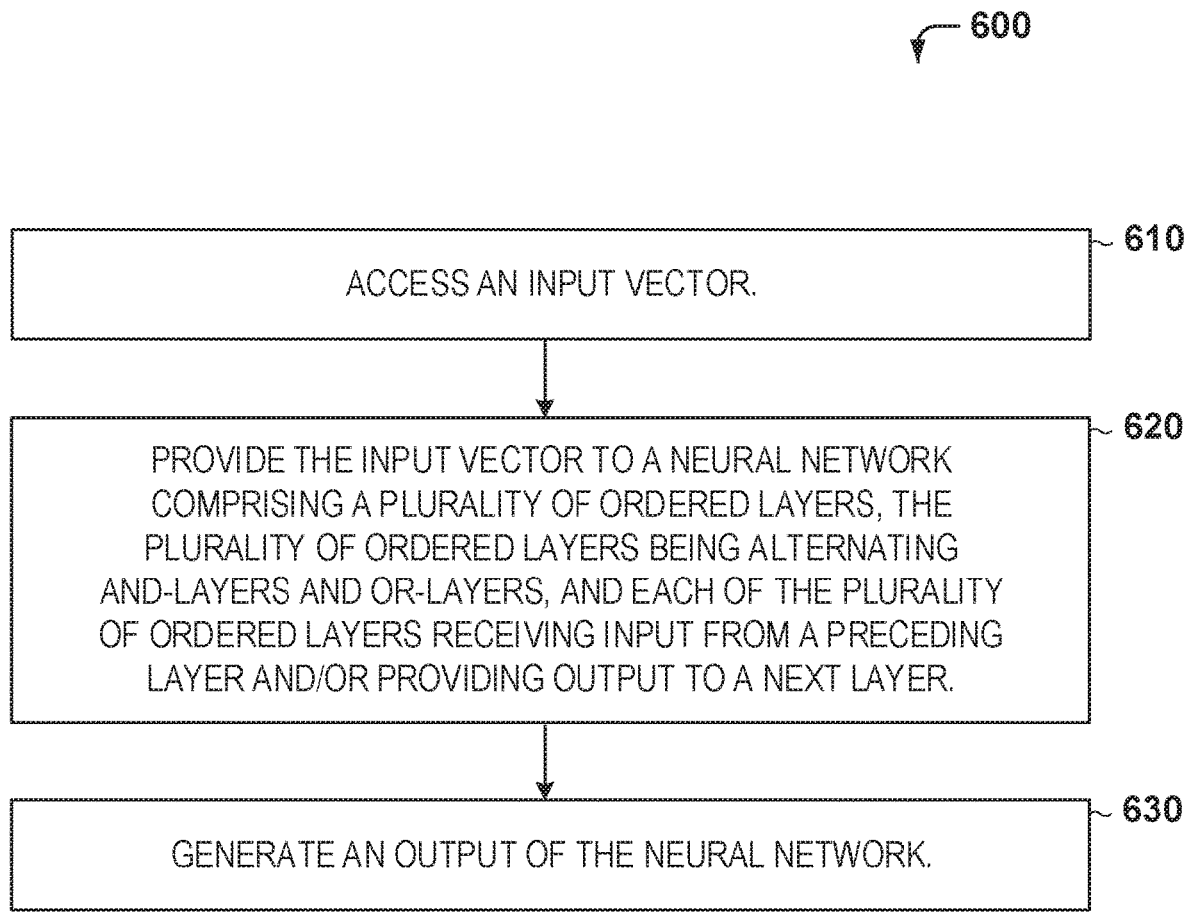
FIG. 6 is a flow chart of a method for executing an and-or neural network, in accordance with some embodiments.

FIG. 6 is a flow chart of a method 600 for executing the and-or neural network 590, in accordance with some embodiments. The and-or neural network 590 is executed by processing circuitry.

At operation 610, the processing circuitry accesses the input vector 510. The input vector 510 includes a numeric representation of an input to the neural network 590. For example, the input vector 510 may be a numeric representation of an image for image recognition. In some cases, the input vector is a logarithmic probability vector. In some cases, the processing circuitry converts the input vector to a logarithmic probability vector.

At operation 620, the processing circuitry provides the input vector 510 to the neural network 590. The neural network 590 includes a plurality of ordered layers 520-570. The multiple ordered layers 520-570 are alternating AND-layers 520, 540, 560 and OR-layers 530, 550, 570. Each of the plurality or ordered layers 520-570 receives input form a preceding layer and/or provides output to a next layer.

At operation 630, the processing circuitry generates an output 580 of the neural network 590 based on an output of a last layer 570 of the plurality of ordered layers 520-570 of the neural network 590. Details of example operations of the OR-layers 530, 550, 570 are described in conjunction with FIG. 7. Details of example operations of the AND-layers 520, 540, 560 are described in conjunction with FIG. 8. In some cases, the input vector is a numeric representation of an image for image recognition (e.g., a numeric representation of a photograph), and the output is an output of the image recognition (e.g., an indication that an object or person in the image was recognized). The output of the image recognition may represent an object depicted in the image.

Figure 7:
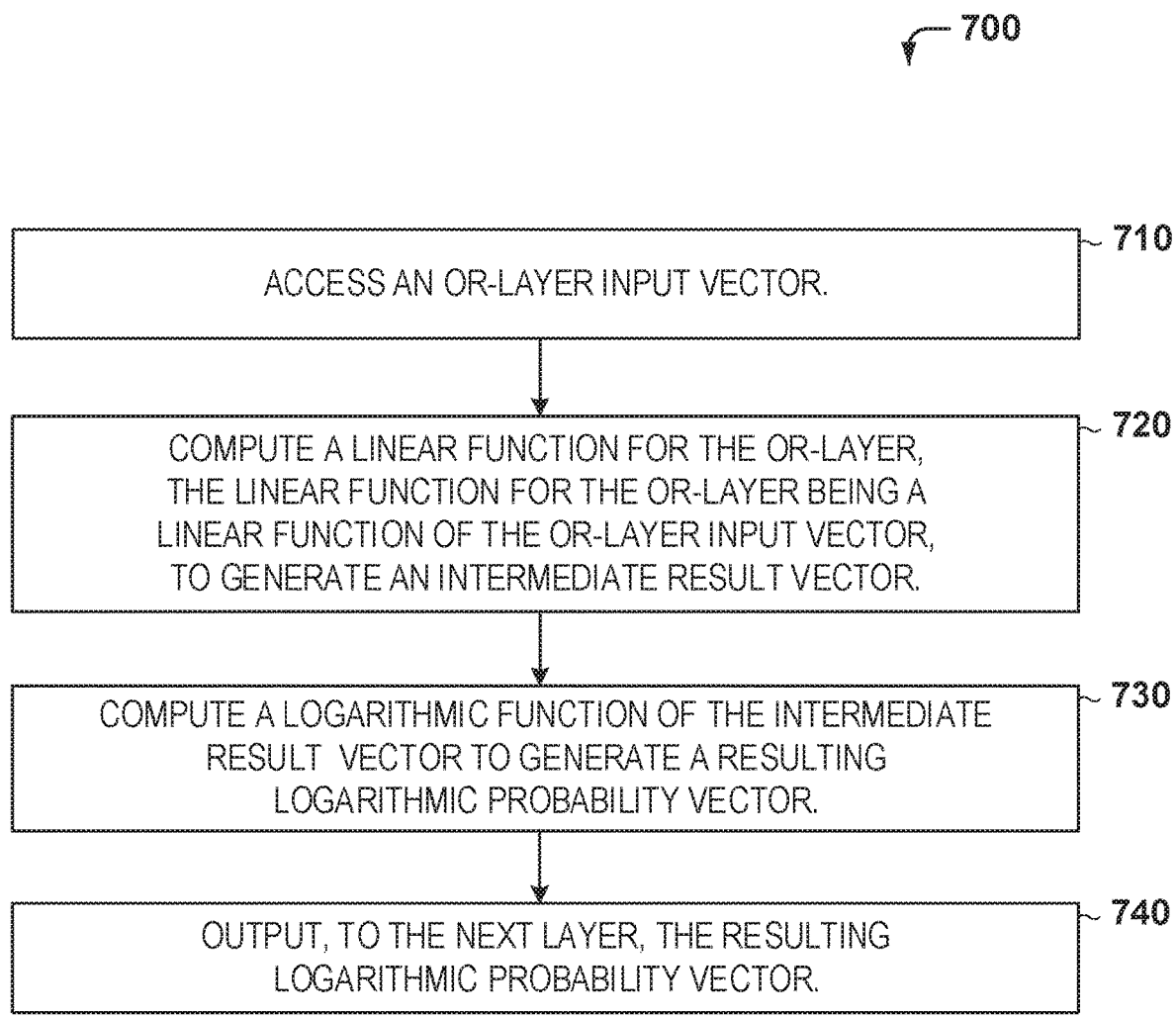
FIG. 7 is a flow chart of a method for executing an OR-layer of an and-or neural network, in accordance with some embodiments.

FIG. 7 is a flow chart of a method 700 for executing an OR-layer (e.g., one of the OR-layers 530, 550, 570) of an and-or neural network, in accordance with some embodiments. The OR-layer is executed by processing circuitry.

At operation 710, the processing circuitry accesses an OR-layer input vector.

At operation 720, the processing circuitry computes a linear function for the OR-layer. The linear function for the OR-layer is a linear function of the OR-layer input vector. Each OR-layer has a different linear function for the OR-layer. For example, OR-layer 530 has a different linear function than OR-layer 550 and OR-layer 570. Or-layer 550 has a different linear function than OR-layer 570. In some cases, the linear function for the OR-layer scales the OR-layer input vector to a range of between −1 and +1.

At operation 730, the processing circuitry computes a logarithmic function of the intermediate result vector to generate a resulting logarithmic probability vector. In some cases, the linear function for the OR-layer is specified by a weight vector that is normalized to ensure that the intermediate result vector is bounded, and an input to the logarithmic function is positive.

At operation 740, the processing circuitry outputs, to the next layer, the resulting logarithmic probability vector.

Figure 8:
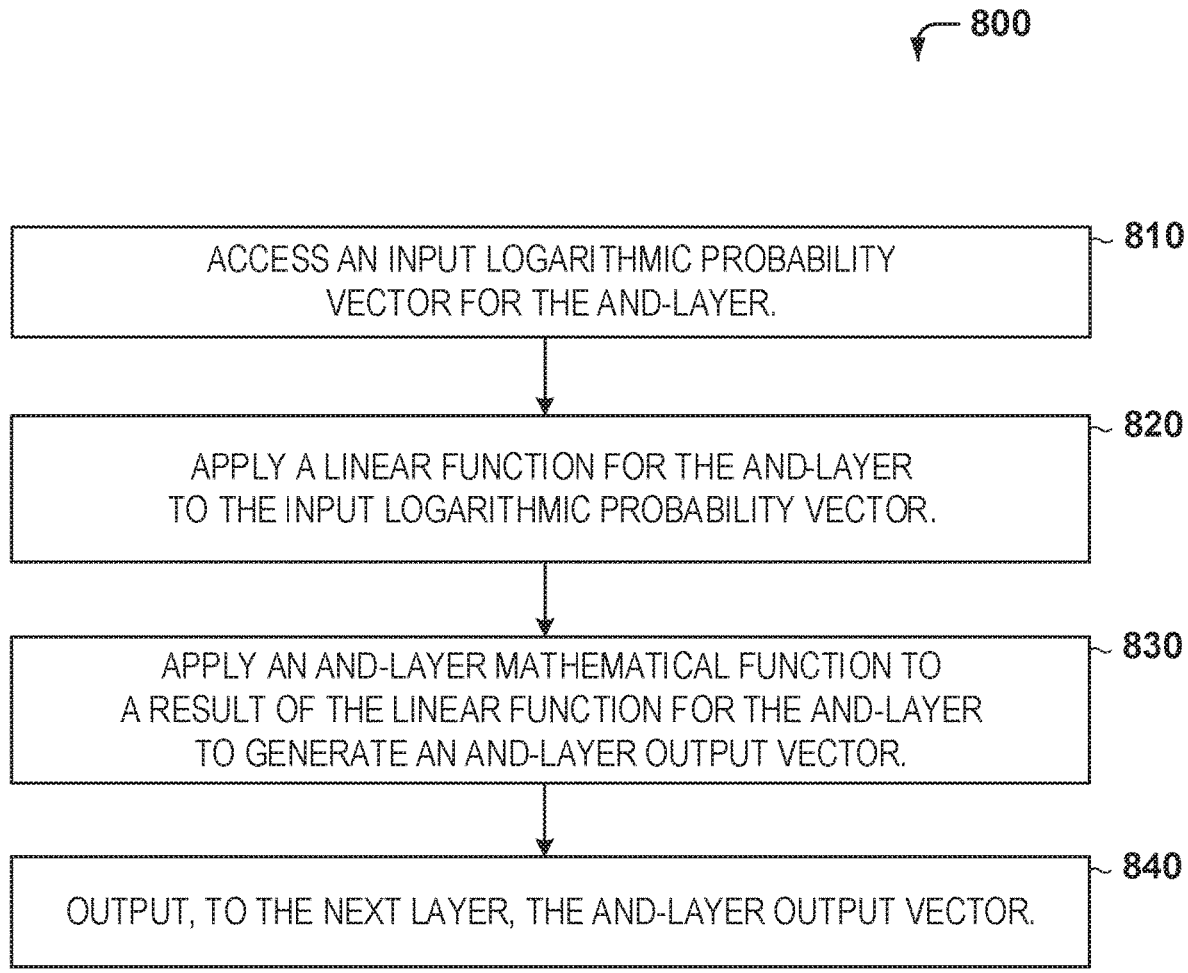
FIG. 8 is a flow chart of a method for executing an AND-layer of an and-or neural network, in accordance with some embodiments.

FIG. 8 is a flow chart of a method for executing an AND-layer (e.g., one of the AND-layers 520, 540, 560) of an and-or neural network, in accordance with some embodiments. The AND-layer is executed by processing circuitry.

At operation 810, the processing circuitry accesses an input probability vector for the AND-layer. In some cases, the input logarithmic probability vector for the initial AND-layer 520 of the plurality of ordered layers 520-570 is the input vector 510 to the neural network 590.

At operation 820, the processing circuitry applies a linear function for the AND-layer to the input logarithmic probability vector. Each AND-layer has a different linear function. For example, AND-layer 520 has a different linear function than AND-layer 540 and AND-layer 560. AND-layer 540 has a different linear function than AND-layer 560.

At operation 830, the processing circuitry applies an AND-layer mathematical function to a result of the linear function for the AND-layer to generate an AND-layer output vector. The AND-layer mathematical function may be a sigmoid function. The sigmoid function may be a hyperbolic tangent (tanh) function applied to the result of the linear function for the AND-layer of the input logarithmic probability vector. Alternatively, the sigmoid function may be a logistic function.

At operation 840, the processing circuitry outputs, to the next layer, the AND-layer output vector.

In some cases, the processing circuitry trains the neural network to learn each linear function for each AND-layer. In some cases, the processing circuitry trains the neural network to learn each linear function for each OR-layer.

A few approaches have attempted to learn pooling operations beyond spatial pooling. Maxout networks incorporate layers in which each unit computes a max of k linear functions of the inputs. This permits a piece-wise approximation to an arbitrary convex function, and can be seen as a generalized learning of max operation in which the learned linear functions select the units to perform the maximum over. However, the max operation is not a smooth non-linearity, and information about which linear function was selected as the maximum is still discarded. Cross-channel pooling performs a maximum across feature layers at a particular spatial location, but ideally a learned combination of spatial and cross-feature learning is desired rather than requiring the pooling arrangement to be specified. In cross-convolutional-layer pooling, two consecutive convolutional layers are employed in which one directs a weighted-sum pooling of the features provided by the other. Note that this provides generalized pooling but only by averaging, a linear pooling operation, and only after convolutional layers. In some cases, Generalizing Pooling Functions use Mixed, Gated and Tree methods. Such tree pooling provides an approach, similar to decision network, for learning hierarchical pooling filters.

Some aspects advance a new type of network formed by alternating layers of AND-like and OR-like operators which provide similar function to AND and OR logic gates. Input to AND-layers are treated as log probabilities, and linear summation of the log probabilities provides a multiplicative operation of the input probabilities. A sigmoidal or tanh( ) function provides normalized exponentiated output which is treated as event probabilities into the subsequent OR-layer. The OR-layer performs linear combination of the input probabilities, with a logarithmic non-linear activation to return the output domain into the log-probability space for the next AND-layer. These OR-layers can be interpreted as generalized pooling layers, capable of automatically learning new generalized pooling operations without enforcing a MAX pooling constraint. The layers can also be seen as a way to support general computational models that employ generalized AND-like and OR-like operations on multiple input dimensions.

Some innovative aspects provide a novel deep learning network architecture formed from alternating soft AND-like and OR-like operations. Some innovative aspects provide implementation of a generalized pooling operation based on a linear combination of input probabilities. Some innovative aspects provide use of a logarithmic activation function in a deep learning network. This permits subsequent linear layers to perform multiplicative operations in the original input space.

Artificial neural networks (ANNs), are comprised of a set of connected computational nodes, or artificial neurons. These nodes are grouped into a series of computational layers, each of which computes a function of its inputs and feeds the result, the layer's activations, into either the subsequent layer or the output of the network. This type of network is a feed-forward network, provided the data takes an acyclic path through the network layers. The initial layer of an ANN, known as the data or input layer, receives a set of data values, which are the data features or elements to be processed. For image recognition problems, these inputs are likely image pixels, but ANNs are a general computational architecture and not restricted to any specific type of data. The final layer of the network, the output layer, returns a set of predicted values from the network for each data instance. For classification problems, this is most often a class assignment, with each element of an output vector corresponding to a particular class label. For example, one may wish to classify objects depicted in images, and each class may represent a specific type of object. Layers between the input and output layer are referred to as hidden layers, since the desired activations for these layers are unknown, and must be inferred. Networks with at least one hidden layer are called "deep", and form the basis of methods popularly referred to as Deep Learning. Parameters, known as weights, inform the computation at each layer according to a mathematical specification. Each layer in the network need not use the same mathematical specification, and choices regarding the number of nodes per layer, and the type of function computed by each layer, are jointly referred to as the network architecture. The technology described herein, in some aspects, is directed to a new type of network architecture formed by interleaving two types of layers, described below, which are referred to here as "AND" and "OR" layers. These layers are analogous to "soft" non-binary versions of the logic gates of the same name that form the basis for modern computational circuits, and are designed to compute intersections and unions, respectively, of statistical probabilities.

Probabilistic interpretations of artificial neural networks have a rich history, including probabilistic graphical models that describe how data is generated as a stochastic process from a set of random variables. The behavior of deterministic feed-forward networks has also been described in terms of statistical probabilities. It is common to train the output layer of a feed-forward network to compute what are considered log-odds, or logits, and to estimate the probability of a class assignment via exponentiation and subsequent normalization across the potential outcomes. In the case each data instance belongs to only one class, this normalization is performed across the class outputs using the softmax function to ensure the predicted probabilities for all classes sum to 1. While the output of deterministic networks is often treated as a collection of probability estimates, it is less common, perhaps, to also consider the intermediate computations in this light. The current invention takes inspiration from the idea that these intermediate computations estimate probabilities that statistically relevant features are present within the input data.

Some aspects consider a probabilistic interpretation of a deterministic feed-forward network. AND-layers have the capacity to compute functions based on the intersection of event probabilities, and OR-layers based on the union of event probabilities. These intermediate events are inherent features of the data discovered by the network through training and inferred by the network during the feed-forward computation. The proposed network architecture consists of alternating these types of layers. Each type of layer may be either dense or convolutional. Some schemes have implemented AND-like and OR-like operations using element-wise minimum and maximum operations, but these are discontinuous functions and the groups of elements they are computed over must be defined a priori. Some implementations consist of smooth and differentiable AND-like and OR-like operations composed of linear functions with logistic and logarithmic operations. Unlike other schemes, this allows the system/apparatus to learn which groups of elements should contribute to each output.

In some aspects of the proposed network architecture, AND-layers are designed to identify statistically relevant features contained in the data. For example, some features contained in images are pixel gradients with varying position, scale, and orientation. In general, features are computed by identifying the co-occurrence of multiple events that serve as indicators that the feature exists. The inputs to an AND-layer may be log probabilities for a set of indicators, and each node in the AND-layer may estimate the probability that some feature is present in the data sample based on the inputs. This output probability is scaled and shifted to the range $[-1, 1]$, rather than $[0, 1]$ to allow a subsequent layer to more easily negate them using negative weights (i.e., to provide NOT logic gates).

To specify the AND-layer mathematically, given an input vector x, weight matrix W and bias vector b, the AND-layer computes an output vector $z=\tanh(y/2)$, where $y=Wx+b$. It should be noted that tanh( ) may be used in many ANNs as an activation function. In some aspects, the AND-layers are used in combination with the OR-layers described herein.

Figure 9:
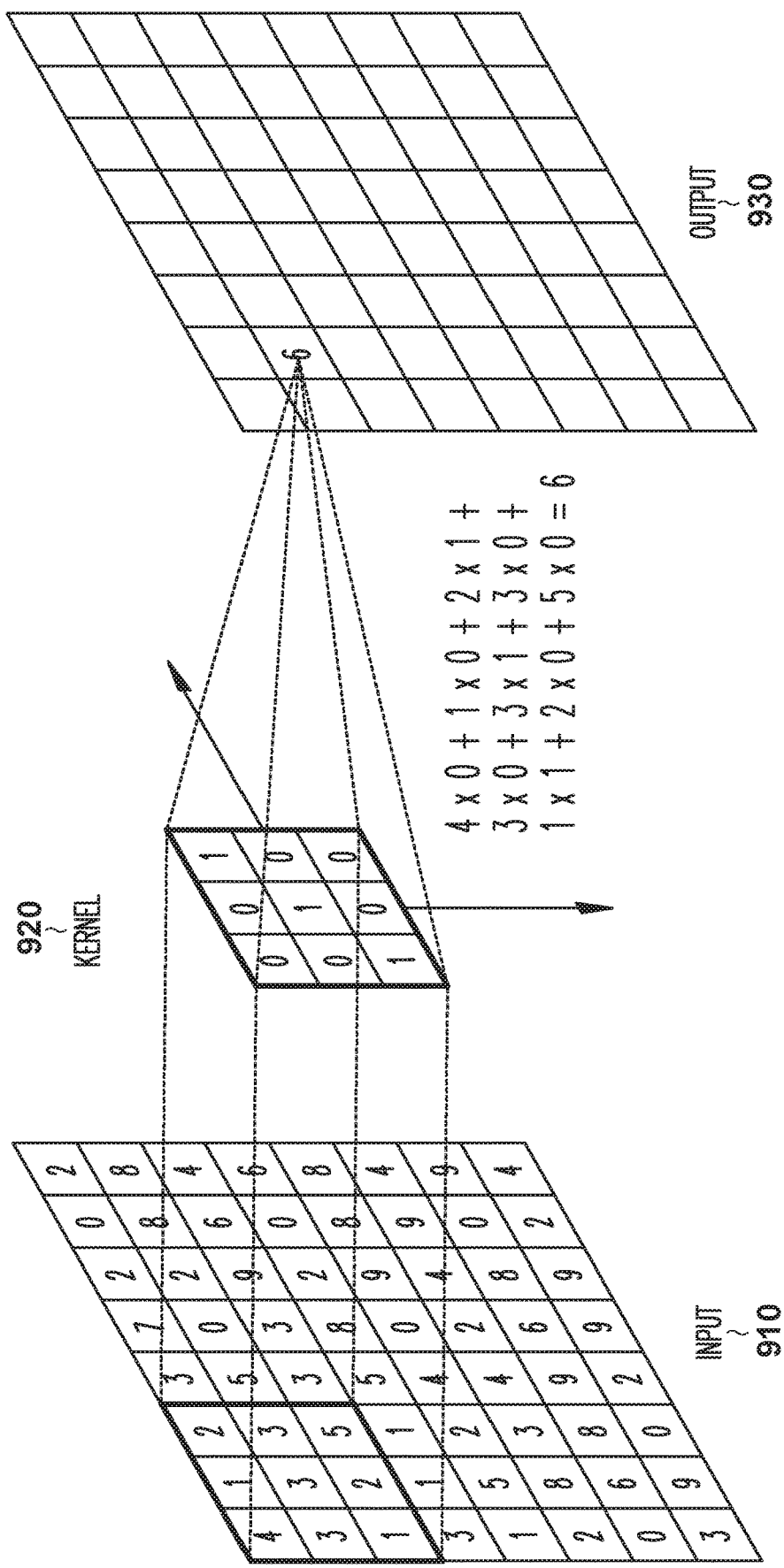
FIG. 9 illustrates an example convolution, in accordance with some embodiments.

Convolutional Neural Networks (CNNs), most commonly applied to images, restrict their linear operations to spatial neighborhoods for some layers, referred to as the convolutional layers. The weights for these localized linear functions are contained in a set of kernels, or filters, applied as a dot product at each position in the input space as shown in FIG. 9. A convolution is a linear operation, and mathematically equivalent to multiplying the input, reshaped as a vector, with a weight matrix parameterized by the kernels. This matrix need not be explicitly represented—since most of its weights might be effectively zero, and it is more computationally efficient to perform the computation as a set of convolutions. However, the mathematical equivalence allows direct application of the formula given for AND-layers without involving specifics of the convolution process. For the AND-layer, the intermediate result y=Wx+b, is computed as a convolution using one or more convolution kernels and the output z=tanh(y/2) computed as in the non-convolutional case. In the 2D case, where the input is an image X(c, r) spanning columns c∈1 . . . C, and rows r∈1 . . . R, and given k convolutional kernels $H_k(c,r)$, the 2D output channel $$Z_k := \tanh\left(\frac{X(c,r) * H_k(c,r)}{2}\right),$$

where * denotes discrete convolution.

FIG. 9 illustrates an example convolution, in accordance with some embodiments. As shown in FIG. 9, a part of the input vector 910 is passed through the kernel 920 (e.g., by computing a dot product) to compute an element of the output vector 930. An example of 2D convolution is shown in FIG. 9. A kernel 920, or filter, is applied as a dot product at each position in the input vector 910. Elements in the kernel 920 are multiplied point for point with the elements in the input vector 910, and added together to provide the corresponding output value (in the output vector 930) for each position. Convolution, vs. correlation, flips the kernel 920 in both dimensions before application but otherwise these two operations are equivalent.

For independent events, the probability of the intersection of two or more events is the product of the event probabilities. For example, if events A and B are independent then P(A and B)=P(A∩B)=P(A)P(B). Taking the logarithm of the inputs enables products to be performed by linear combination, since P(A) P(B)=exp[log P(A)+log P(B)]. This idea may serve as a basis for the AND-layer. It follows that, in general, a linear combination of log probabilities can compute products as well as more complex functions involving higher-order terms of the underlying probabilities.

For an N×1 input vector x and M×1 output vector z, some aspects consider input elements $x_{\in e1 \ldots N}$ to estimate the log probability of a set of indicators. A direct approach may compute the linear combination y=Wx+b, for an M×N matrix W, and return exp(y) as the layer output. While this computes intersections of probabilities for specific values of W, the range of the output is unconstrained in general, and therefore cannot be interpreted as a set of probabilities. Instead, some aspects pass the intermediate result y through a logistic function to constrain the output to the desired range. This is equivalent to applying a logistic regression, given the input elements x as predictor variables. Some aspects model the probability that a set of M features are present using implicit binary state variables $s_{j \in 1 \ldots M}$ to indicate the existence of each feature, where $s_j$ equals 1 if feature j is present, and 0 if it is not. For example, $s_j$ may represent the existence of an edge in an image. The proportional probability of the existence of feature j given the data and parameterized by W and b is modeled as:

$$P(s_j | x; W, b) \propto \exp\left[s_j\left(b_j + \sum_j W_{ij}x_i\right)\right].$$

The probabilities for the binary states must sum to 1. Therefore the probability of feature j is:

$$p_j = \frac{P(s_j=1)}{P(s_j=0)+P(s_j=1)} = \frac{e^y}{e^0+e^y} = \frac{1}{1+e^{-y}}.$$

In some aspects, that this probability is the result of a sigmoid logistic on y, and with range [0, 1]. Some aspects re-range the probabilities to [−1, 1] by shifting and scaling, and assign to the output vector z:

$$z_j := 2p_j - 1 = \frac{2}{1+e^{-y}} - \frac{1+e^{-y}}{1+e^{-y}} = \frac{1-e^{-y}}{1+e^{-y}} = \tanh\left(\frac{y}{2}\right).$$

In some aspects, the divisor of 2 in the above equation may be dropped without loss of generality, since this constant can be absorbed into the learned weights W and bias b.

In the disclosed network architecture, OR-layers may be designed to identify invariances, mutually exclusive groups of features that can identify a common cause. Examples of invariances in computer vision include different camera viewpoints of the same object or feature, such as invariances of position, scale and rotation. The inputs to an OR-layer are assumed to be probabilities, rescaled and shifted to the range [−1, 1], as output by the AND-layer. In some examples, the AND-layers and OR-layers are interleaved, alternating between AND and OR. The output of an OR-layer are considered to be log probabilities for features, having accounted for some set of learned invariances. These log probabilities can be passed to a subsequent AND-layer, or used as the output of the network. The structure of the OR-layer is general enough to account for various statistical dependencies between the input feature probabilities.

Given an N×1 input vector x, M×N weight matrix W, the OR layer computes an M×1 output vector z=ln(y+1+∈), where $$y_{j\in 1 \ldots M} = \frac{\sum_i W_{ij}x_i}{\sum_i |W_{ij}|}.$$

In this expression, ln( ) is the natural logarithm, and ∈ is a small constant (e.g. 1e−5) to ensure against numerical overflow.

Given an image X(c, r) spanning columns c∈1 . . . C, and rows r∈1 . . . R, and k convolutional kernels $H_k$(c, r), the kernels are first normalized as $$H'_k(c,r) := \frac{H_k(c,r)}{\sum_{c,r} |H_k(c,r)|}.$$

Then, the 2D output channel $Z_k$:=ln(X(c, r)*$H'$(c,r)+1+∈), where * denotes discrete convolution.

For mutually exclusive events, the probability of the union of the events is given by summation of the event probabilities. For example, if events A and B are mutually exclusive then P(A or B)=P(A∪B)=P(A)+P(B). For any two events A and B, P(A∪B)=P(A)+P(B)−P(A∩B). Note that event unions are computed as a linear combination of events and event intersections. The output of an AND-layer, a set of N shifted and scaled events serves as input to the subsequent OR-layer. Thus, OR-layer input $x_i=2p_i-1$ for some event probability $p_j$. Negative elements in W invert the input probabilities, effectively providing a NOT operator, since $(-1)x_i=-(2p_i-1)=1-2p_i=2-2p_i-1=2(1-p_i)-1=2\bar{p}_i-1$. Intermediate vector y is a linear combination of the inputs, and therefore also of the input probabilities, and the divisive normalization with the weight magnitudes ensures that each $y_j$ is a weighted average of values, where each value is either an input $x_i=2p_i-1$ or its complement $-x_i=2\bar{p}_i-1$.

Each $y_j$ is thus a weighted average of scaled and shifted probabilities, and it may be considered to represent some scaled and shifted probability $p_j$, computed from the input probabilities: $y_j=2p_j-1$. To compute a log probability, which is the expected input into the next AND-layer, the processing circuitry transforms by shifting and taking the natural logarithm, $z_j=\ln(y_j+1+\in)\approx\ln(2p_j-1+1)=\ln(p_j)+\ln(2)$, which is within an additive constant of the desired probability. The processing circuitry can subtract the constant, or leave it in without loss of generality, since it is easily absorbed by the bias parameter in the subsequent AND-layer, or normalized out by a softmax function if this is the final layer. To demonstrate stability, the processing circuitry may ensure that $y+1+\in>0$, for all real values of W and x, s.t. $-1\geq x\geq 1$. Otherwise, the processing circuitry may attempt to compute the logarithm of a non-positive value, resulting in a numerical overflow error. Applying Theorem 1, in Appendix A, proves $-1\geq y\geq 1$, which ensures this overflow cannot occur.

Figure 10:
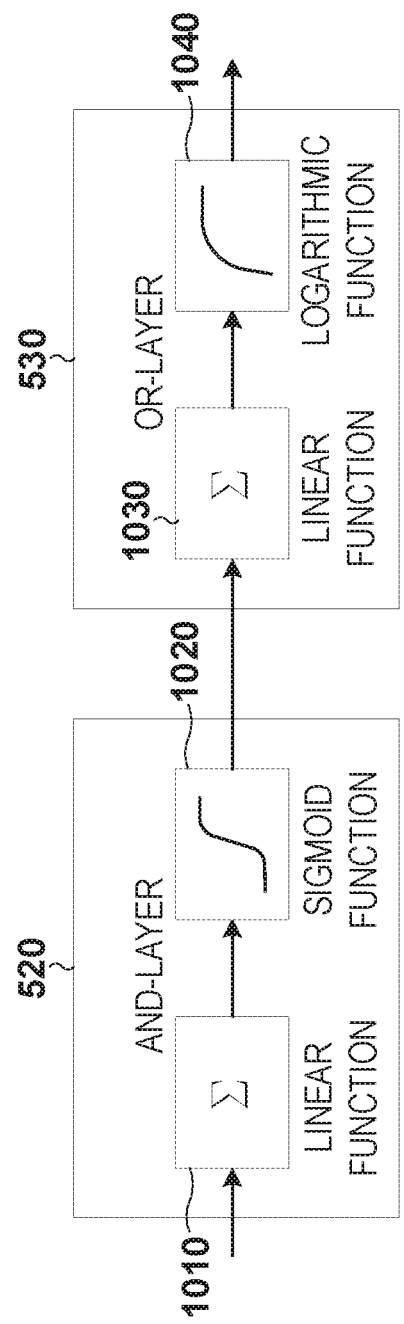
FIG. 10 is a data flow diagram of an AND-layer and an OR-layer, in accordance with some embodiments.

FIG. 10 is a data flow diagram of an AND-layer and an OR-layer, in accordance with some embodiments. However, it should be noted that other AND-layer(s) and/or OR-layer(s) may be used in conjunction with the technology described herein. As shown in FIG. 10, input is provided to the AND-layer 520. This input is provided to a linear function 1010 of the AND-layer 520, and the output of that is provided to a sigmoid function 1020 of the AND-layer 520, which generates the output of the AND-layer 520. The output of the AND-layer 520 is the input of the OR-layer 530. The OR-layer 530 processes its input through a linear function 1030 of the OR-layer 530. The output of the linear function 1030 is the input to the logarithmic function 1040 of the OR-layer 530. The logarithmic function 1040 computes the output of the OR-layer 1030. The other AND-layers 540, 560 shown in FIG. 5 operate similarly to the AND-layer 520. The other OR-layers 550, 570 shown in FIG. 5 operate similarly to the OR-layer 530.

Figure 11:
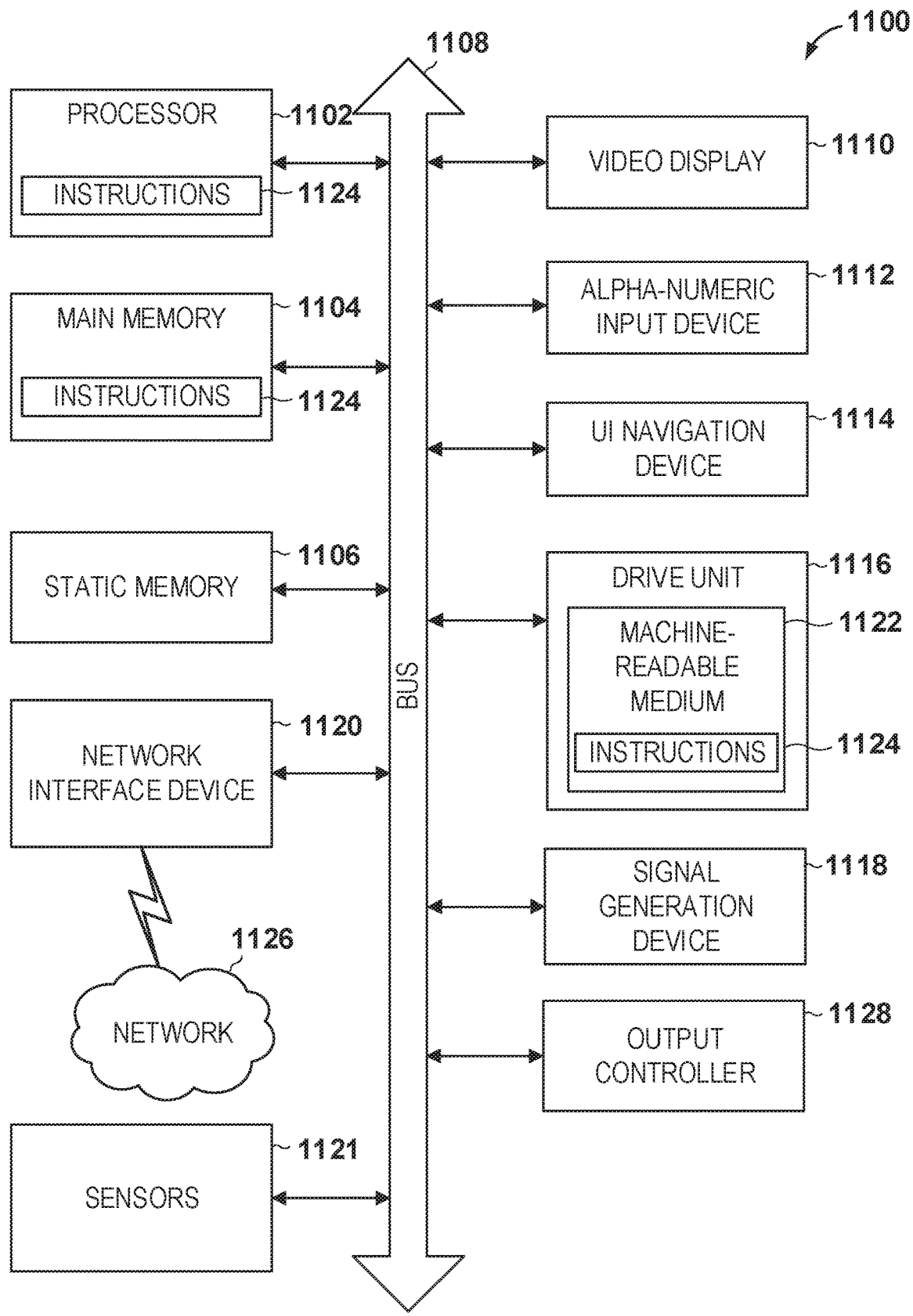
FIG. 11 is a block diagram of a computing machine, in accordance with some embodiments.

Some aspects of the technology described herein are directed to a neural network system or a neural network apparatus that comprises processing circuitry and memory, for example, as described in conjunction with FIG. 11. Some aspects of the technology described herein are directed to a computer architecture for and-or neural networks. The computer architecture for and-or neural networks may include the neural network system or the neural network apparatus.

FIG. 11 illustrates a block diagram of a computing machine 1100 in accordance with some embodiments. In some embodiments, the computing machine 1100 may store the components shown in the data flow diagram 500 of FIG. 5—the input vector 510, the output 580, and the neural network 590. In alternative embodiments, the computing machine 1100 may operate as a standalone device or may be connected (e.g., networked) to other computers. In a networked deployment, the computing machine 1100 may operate in the capacity of a server, a client, or both in server-client network environments. In an example, the computing machine 1100 may act as a peer machine in peer-to-peer (P2P) (or other distributed) network environment. In this document, the phrases P2P, device-to-device (D2D) and sidelink may be used interchangeably. The computing machine 1100 may be a specialized computer, a personal computer (PC), a tablet PC, a personal digital assistant (PDA), a mobile telephone, a smart phone, a web appliance, a network router, switch or bridge, or any machine capable of executing instructions (sequential or otherwise) that specify actions to be taken by that machine.

Examples, as described herein, may include, or may operate on, logic or a number of components, modules, or mechanisms. Modules and components are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems/apparatus (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" (and "component") is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

The computing machine 1100 may include a hardware processor 1102 (e.g., a central processing unit (CPU), a GPU, a hardware processor core, or any combination thereof), a main memory 1104 and a static memory 1106, some or all of which may communicate with each other via an interlink (e.g., bus) 1108. Although not shown, the main memory 1104 may contain any or all of removable storage and non-removable storage, volatile memory or non-volatile memory. The computing machine 1100 may further include a video display unit 1110 (or other display unit), an alphanumeric input device 1112 (e.g., a keyboard), and a user interface (UI) navigation device 1114 (e.g., a mouse). In an example, the display unit 1110, input device 1112 and UI navigation device 1114 may be a touch screen display. The computing machine 1100 may additionally include a storage device (e.g., drive unit) 1116, a signal generation device 1118 (e.g., a speaker), a network interface device 1120, and one or more sensors 1121, such as a global positioning system (GPS) sensor, compass, accelerometer, or other sensor. The computing machine 1100 may include an output controller 1128, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The drive unit 1116 (e.g., a storage device) may include a machine readable medium 1122 on which is stored one or more sets of data structures or instructions 1124 (e.g., software) embodying or utilized by any one or more of the techniques or functions described herein. The instructions 1124 may also reside, completely or at least partially, within the main memory 1104, within static memory 1106, or within the hardware processor 1102 during execution thereof by the computing machine 1100. In an example, one or any combination of the hardware processor 1102, the main memory 1104, the static memory 1106, or the storage device 1116 may constitute machine readable media.

While the machine readable medium 1122 is illustrated as a single medium, the term "machine readable medium" may include a single medium or multiple media (e.g., a centralized or distributed database, and/or associated caches and servers) configured to store the one or more instructions 1124.

The term "machine readable medium" may include any medium that is capable of storing, encoding, or carrying instructions for execution by the computing machine 1100 and that cause the computing machine 1100 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, machine readable media may include non-transitory machine readable media. In some examples, machine readable media may include machine readable media that is not a transitory propagating signal.

The instructions 1124 may further be transmitted or received over a communications network 1126 using a transmission medium via the network interface device 1120 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 1120 may include one or more physical jacks (e.g., Ethernet, coaxial, or phone jacks) or one or more antennas to connect to the communications network 1126.

Although an embodiment has been described with reference to specific example embodiments, it will be evident that various modifications and changes may be made to these embodiments without departing from the broader spirit and scope of the present disclosure. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, user equipment (UE), article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

APPENDIX A

Theorem 1. Let $$y = \frac{\sum_i w_i x_i}{\sum_i |w_i|},$$

for real vectors x and w, subject to $-1 \geq x_i \geq 1$ $\forall i$.

Then, $-1 \geq y \geq 1$.
Proof. Let $$u_i = \frac{|W_i|}{\sum_k |W_k|},$$

and $\alpha_i = \mathrm{sgn}(w_i) x_i$. Thus, $y = \Sigma_i u_i \alpha_i$.
Since $|\alpha_i| = |x_i| \leq 1$, we know $-1 \leq \alpha_i \leq 1 \forall i$.
Also, $$\sum_i u_i = \sum_i \frac{|W_i|}{\sum_k |W_k|} = \frac{\sum_i |W_i|}{\sum_k |W_k|} = 1.$$

Let $$\alpha_{MIN} = \min_i \alpha_i, \text{ and } \alpha_{MAX} = \max_i \alpha_i.$$

Then, $$\alpha_{MAX} - y = \alpha_{MAX} - \sum_i u_i \alpha_i$$
$$= \alpha_{MAX} \sum_i u_i - \sum_i u_i \alpha_i$$
$$= \sum_i \alpha_{MAX} u_i - u_i \alpha_i$$
$$= \sum_i u_i (\alpha_{MAX} - \alpha_i) \geq 0.$$

Likewise, $$y - \alpha_{MIN} = \sum_i u_i \alpha_i - \alpha_{MIN}$$
$$= \sum_i u_i \alpha_i - \alpha_{MIN} \sum_i u_i$$
$$= \sum_i u_i \alpha_i - \alpha_{MIN} u_i$$
$$= \sum_i u_i (\alpha_i - \alpha_{MIN}) \geq 0.$$

It follows that $-1 \leq \alpha_{MIN} \leq y \leq \alpha_{MAX} \leq 1$.

What is claimed is:

1. A neural network apparatus, the apparatus comprising: processing circuitry and memory; the processing circuitry to:
access an input vector, the input vector comprising a numeric representation of an input to a neural network;
provide the input vector to the neural network comprising a plurality of ordered layers, wherein the plurality of ordered layers are alternating AND-layers and OR-layers, and wherein each of the plurality of ordered layers receives input from a preceding layer and/or provides output to a next layer, wherein the neural network comprises at least one OR-layer that receives input from at least one AND-layer; and
generate an output of the neural network based on an output of a last one of the plurality of ordered layers in the neural network;
wherein each OR-layer, when executed, causes the processing circuitry to:
access an OW-layer input vector;
compute a linear function for the OR-layer, the linear function for the OR-layer being a linear function of the OR-layer input vector, to generate an intermediate result vector, wherein each OR-layer has a different linear function for the OR-layer;
compute a logarithmic function of the intermediate result, vector to generate a resulting logarithmic probability vector, wherein the linear function for the OR-layer is specified by a weight vector that is normalized to ensure that the intermediate result vector is bounded, and an input to the logarithmic function is positive; and
output, to the next layer, the resulting logarithmic probability vector.

2. The apparatus of claim 1, wherein each AND-layer, when executed, causes the processing circuitry to:
access an input logarithmic probability vector for the AND-layer;
apply a linear function for the AND-layer to the input logarithmic probability vector, wherein each AND-layer has a different linear function;
apply the AND-layer mathematical function to a result of the linear function for the AND-layer to generate an AND-layer output vector; and
output, to the next layer, the AND-layer output vector.

3. The apparatus of claim 2, wherein the processing circuitry is further to:
train the neural network to learn each linear function for each AND-layer; and
train the neural network to learn each linear function for each OR-layer.

4. The apparatus of claim 2, wherein the sigmoid function comprises a hyperbolic tangent (tanh) function applied to the result of the linear function for the AND-layer of the input logarithmic probability vector.

5. The apparatus of claim 2, wherein the sigmoid function comprises a logistic function.

6. The apparatus of claim 2, wherein the input logarithmic probability vector for an initial AND-layer of the plurality of ordered layers is the input vector to the neural network.

7. The apparatus of claim 2, wherein the AND-layer mathematical function is performed in a subsequent layer to the AND-layer and prior to a linear function of a next OR-layer.

8. The apparatus of claim 2, wherein the OR-layer logarithmic function is performed in a subsequent layer to the OR-layer and prior to a linear function of a next AND-layer.

9. The apparatus of claim 1, wherein the linear function for the OR-layer scales the OR-layer input vector to a range of between −1 and +1.

10. The apparatus of claim 1, wherein the input vector comprises the numeric representation of an image for image recognition, and wherein the output is an output of the image recognition.

11. The apparatus of claim 10, wherein the output of the image recognition represents an object depicted in the image.

12. The apparatus of claim 1, wherein the input vector is a logarithmic probability vector.

13. The apparatus of claim 1; wherein the processing circuitry is further to:

convert the input vector to a logarithmic probability vector.

14. The apparatus of claim 1, wherein the logarithmic function is different from an AND-layer mathematical function applied in each AND-layer, wherein the AND-layer mathematical function comprises a sigmoid function.

15. A non-transitory machine-readable medium for executing a neural network, the machine-readable medium storing instructions which, when executed by processing circuitry of one or more machines, cause the processing circuitry to:
 access an input vector, the input vector comprising a numeric representation of an input to a neural network;
 provide the input vector to the neural network comprising a plurality of ordered layers, wherein the plurality of ordered layers are alternating AND-layers and OR-layers, and wherein each of the plurality of ordered layers receives input from a preceding layer and/or provides output to a next layer, wherein the neural network comprises at least one OR-layer that receives input from at least one AND-layer; and
 generate an output of the neural network based on an output of a last one of the plurality of ordered layers in the neural network;
 wherein each OR-layer, when executed, causes the processing circuitry to:
  access an OR-layer input vector;
  compute a linear function for the OR-layer, the linear function for the OR-layer being a linear function of the OR-layer input vector; to generate an intermediate result vector, wherein each OR-layer has a different linear function for the OR-layer;
  compute a logarithmic function of the intermediate result vector to generate a resulting logarithmic probability vector, wherein the linear function for the OR-layer is specified by a weight vector that is normalized to ensure that the intermediate result vector is bounded, and an input to the logarithmic function is positive; and
  output, to the next layer, the resulting logarithmic probability vector.

16. The machine-readable medium of claim 15, wherein each AND-layer, when executed, causes the processing circuitry to:
 access an input logarithmic probability vector for the AND-layer;
 apply a linear function for the AND-layer to the input logarithmic probability vector, wherein each AND-layer has a different linear function;
 apply the AND-layer mathematical function to a result of the linear function for the AND-layer to generate an AND-layer output vector; and
 output, to the next layer, the AND-layer output vector.

17. The machine-readable medium of claim 16, wherein the processing circuitry is further to:
 train the neural network to learn each linear function for each AND-layer; and
 train the neural network to learn each linear function for each OR-layer.

18. A neural network method implemented at processing circuitry of one or more machines, the method comprising:
 access an input vector, the input vector comprising a numeric representation of an input to a neural network;
 provide the input vector to the neural network comprising a plurality of ordered layers, wherein the plurality of ordered layers are alternating AND-layers and OR-layers, and wherein each of the plurality of ordered layers receives input from a preceding layer and/or provides output to a next layer, wherein the neural network comprises at least one OR-layer that receives input from at least one AND-layer; and
 generate an output of the neural network based on an output of a last one of the plurality of ordered layers in the neural network;
 wherein each OR-layer, when executed, causes the processing circuitry to:
  access an OR-layer input vector;
  compute a linear function for the OR-layer, the linear function for the OR-layer being a linear function of the OR-layer input vector, to generate an intermediate result vector, wherein each OR-layer has a different linear function for the OR-layer;
  compute a logarithmic function of the intermediate result vector to generate a resulting logarithmic probability vector, wherein the linear function for the OR-layer is specified by a weight vector that is normalized to ensure that the intermediate result vector is bounded, and an input to the logarithmic function is positive; and
  output, to the next layer, the resulting logarithmic probability vector.

19. The method of claim 18, wherein each AND-layer, when executed, causes the processing circuitry to:
 access an input logarithmic probability vector for the AND-layer;
 apply a linear function for the AND-layer to the input logarithmic probability vector, wherein each AND-layer has a different linear function;
 apply the AND-layer mathematical function to a result of the linear function for the AND-layer to generate an AND-layer output vector; and
 output, to the next layer, the AND-layer output vector.

* * * * *

UNITED STATES PATENT AND TRADEMARK OFFICE
CERTIFICATE OF CORRECTION

PATENT NO. : 11,037,027 B2
APPLICATION NO. : 16/170656
DATED : June 15, 2021
INVENTOR(S) : Philip A. Sallee It is certified that error appears in the above-identified patent and that said Letters Patent is hereby corrected as shown below:

On the Title Page

In Column 2, under "Other Publications", Line 9, delete "Architechture" and insert --Architecture-- therefor In the Specification In Column 5, Line 35, after "arrive", insert --at--

In Column 5, Line 36, delete "f⁻¹(x)," and insert --$f^{-1}(x)$,-- therefor

In Column 7, Line 28, delete "312" and insert --310-- therefor

In Column 9, Line 18, delete "580." and insert --530.-- therefor

In Column 10, Line 1, delete "Or-layer" and insert --OR-layer-- therefor

In Column 13, Line 44, delete "$x_{\in e1...N}$" and insert --$x_{i \in 1..N}$-- therefor In Column 13, Line 64, delete "$P(s_j|x;W,b) \propto \exp\left[s_j\left(b_j + \sum_j W_{ij} x_i\right)\right]$" and insert --$P(s_j|x;W,b) \propto \exp\left[s_j\left(b_j + \sum_i W_{ij} x_i\right)\right]$-- therefor In Column 15, Line 4, delete "$p_j$." and insert --$p_i$.-- therefor In Column 15, Line 6, delete "$(-1)x_i = -(2p_i-1) = 1-2p_i = 2-2p_i-1 = 2(1-p_i)-1 = 2\bar{p}_i-1$." and insert --$(-1)x_i = -(2p_i-1) = 1-2p_i = 2-2p_i-1 = 2(1-p_i)-1 = 2\bar{p}_i-1$--, therefor Signed and Sealed this
Fifth Day of October, 2021

Drew Hirshfeld
*Performing the Functions and Duties of the*
*Under Secretary of Commerce for Intellectual Property and*
*Director of the United States Patent and Trademark Office*

CERTIFICATE OF CORRECTION (continued)
U.S. Pat. No. 11,037,027 B2

In Column 15, Line 11, delete "$-x_i = 2\bar{p}_i - 1$." and insert --$-x_i = 2\bar{p}_i - 1$-- therefor In Column 15, Line 44, delete "1030." and insert --530.-- therefor In the Claims In Column 20, Line 6, in Claim 1, delete "OW-layer" and insert --OR-layer-- therefor In Column 20, Line 13, in Claim 1, delete "result," and insert --result-- therefor In Column 20, Line 66, in Claim 13, delete "claim 1;" and insert --claim 1,-- therefor In Column 21, Line 19, in Claim 15, delete "laver," and insert --layer,-- therefor In Column 21, Line 20, in Claim 15, delete "OR-laver" and insert --OR-layer-- therefor In Column 21, Line 30, in Claim 15, delete "vector;" and insert --vector,-- therefor In Column 22, Line 28, in Claim 18, delete "OR-laver" and insert --OR-layer-- therefor